Figure 1:
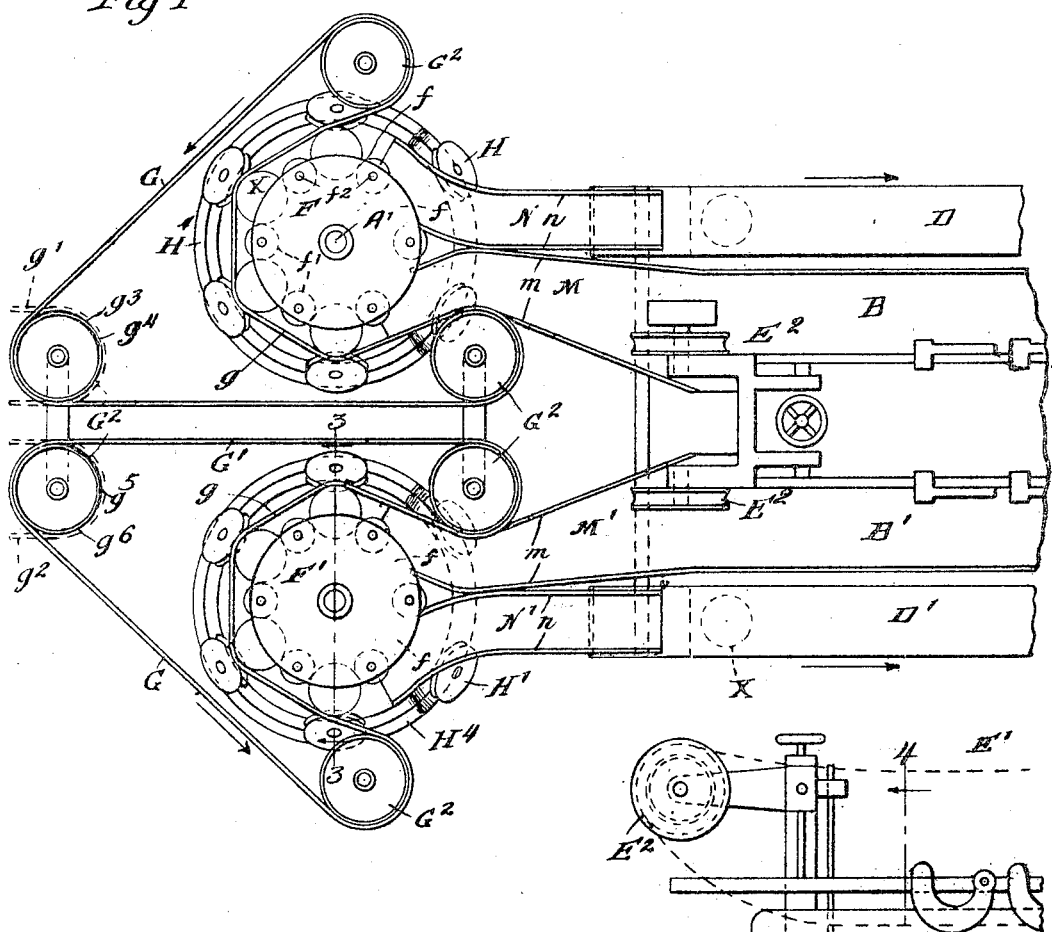

No. 797,898. PATENTED AUG. 22, 1905.
M. LEITCH.
CAN SOLDERING AND SURPLUS SOLDER REMOVING MACHINE.
APPLICATION FILED SEPT. 12, 1904.

2 SHEETS—SHEET 1.

Witnesses:

Inventor
Meredith Leitch

Attorneys

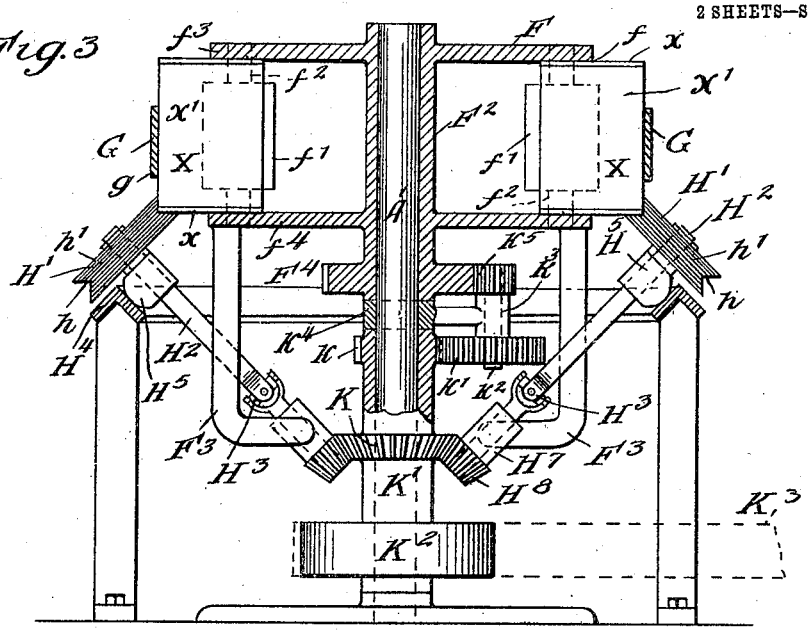
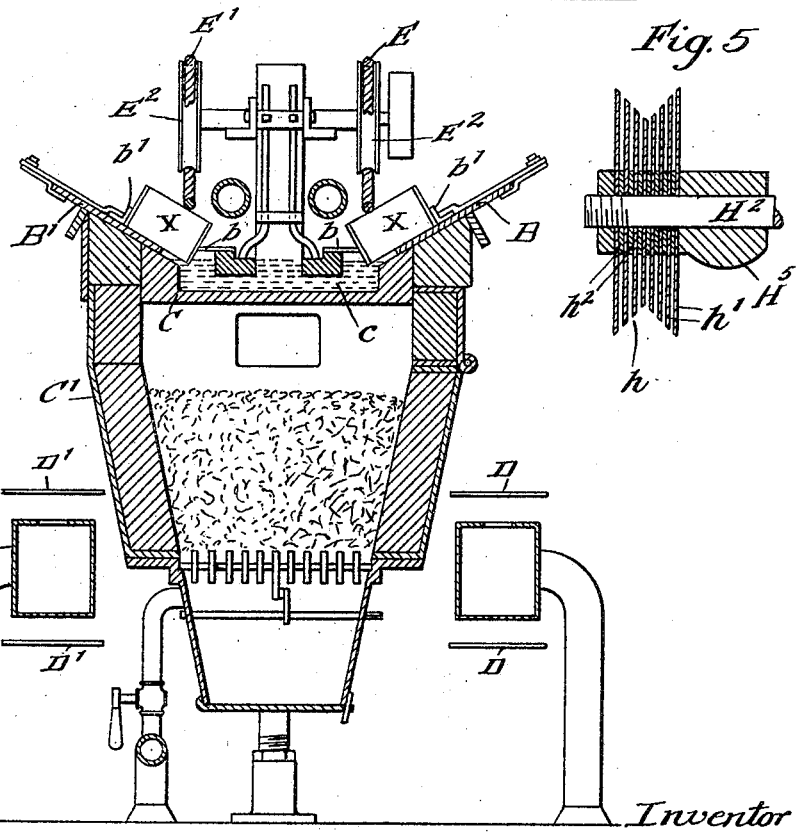

UNITED STATES PATENT OFFICE.

MEREDITH LEITCH, OF NEW YORK, N. Y., ASSIGNOR TO AMERICAN CAN COMPANY, OF NEW YORK, N. Y., A CORPORATION OF NEW JERSEY.

CAN-SOLDERING AND SURPLUS-SOLDER-REMOVING MACHINE.

No. 797,898.     Specification of Letters Patent.     Patented Aug. 22, 1905.

Application filed September 12, 1904. Serial No. 224,054.

*To all whom it may concern:*

Be it known that I, MEREDITH LEITCH, a citizen of the United States, residing in the borough of Brooklyn, in the county of Kings, city and State of New York, have invented a new and useful Improvement in Can-Soldering and Surplus-Solder-Removing Machines, of which the following is a specification.

My invention relates to improvements in machines for soldering the end seams of sheet-metal cans and removing surplus solder therefrom.

In my improved machine the end seams of the cans are soldered in the usual way by rolling them in an inclined position along a runway or track through or in contact with a flux bath or device for applying acid or other flux to the end seams of the cans and then through a solder bath or device for applying molten solder to the end seams of the cans as they are rolled along the inclined guideway or track. A longitudinally and downwardly inclined runway then turns the cans into an upright position and delivers the same onto a horizontally-rotating turret having pockets and antifriction-rollers to receive the cans and permit the cans to be individually rotated as they are carried around by the turret. An endless conveyer, preferably a belt, having a run or loop partially surrounding the turret holds the cans in the pockets of the turret and causes each can to rotate on its own axis as the turret revolves. Rapidly-rotating buffers mounted on the turret on shafts or axes inclined to the shaft or axis of the turret engage the freshly-soldered end seams or corners of the rotating cans as the cans are rotated on their axes and carried around by the turret. A stationary cam surrounding the turret causes the rotary buffers to swing on their axes or be raised and lowered to permit the cans to be received onto and discharged from the turret and to cause the buffers to properly engage the freshly-soldered end seams or corners of the cans. The buffers may be of any suitable kind commonly used for buffing sheet metal, but are preferably each composed of a series of light thin soft flexible textile circular disks, preferably cotton-cloth disks, and are preferably about eight inches in diameter, clamped together on a shaft or mandrel, the centrifugal action of the rapidly-revolving cloth disks serving to lick, kiss, or whip the same against the molten-solder-coated corner surface of the can with a buffing action as contradistinguished from a wiping pressure or movement, and thus removing the surplus solder from the can and polishing and restoring the tin luster to the outside surface of the can which was immersed in the molten solder of the solder-bath in the soldering step or operation. As my rotary buffers revolve in a plane at an angle to the axis of the can, the same have no tendency to throw or scatter fine particles of solder into the cap-opening or filling-opening of the top head of the can.

My invention consists in the novel construction of parts and devices and in the novel combinations of parts and devices herein shown or described.

Figure 2:
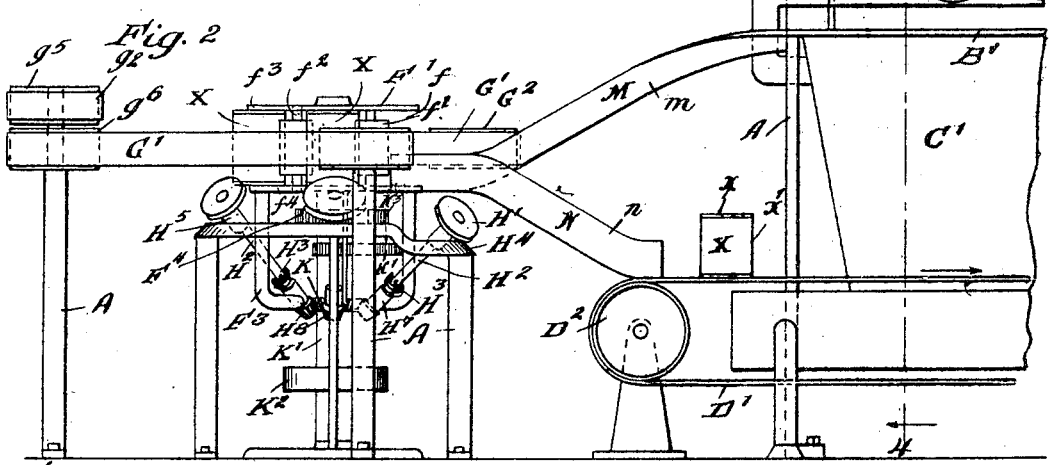

In the accompanying drawings, forming a part of this specification, Figure 1 is a plan view of a device or mechanism embodying my invention. Fig. 2 is a side elevation. Fig. 3 is a vertical section on line 3 3 of Fig. 1. Fig. 4 is a vertical cross-section on line 4 4 of Fig. 2, and Fig. 5 is a detail sectional view of one of the rotary buffers.

In the drawings, A represents the frame of the machine.

B B' are transversely-inclined tracks or runways along which the cans are rolled in an inclined position through the solder bath or vessel C. Each of the can-runways B B' has a lower guide $b$ for the lower ends of the rolling cans to bear against and an upper guide $b'$ to bear against the upper ends of the cans.

C' is a heater, preferably a coal-burning furnace, for keeping the solder $c$ molten.

E E' are endless flexible conveyers, preferably chains, traveling on pulleys $E^2$ for rolling the cans along the transversely-inclined runways B B'.

D D' are cooling-belts traveling on horizontal pulleys $D^2$, upon which cooling-belts the cans after being soldered and the surplus solder removed therefrom are delivered in an upright position and conveyed with their freshly-soldered end seams horizontal while the cans are being cooled and the solder set, thus preventing the solder from collecting more at one part of the seam than another.

F F' are horizontally-rotating turrets, each having an upright hollow shaft or hub $F^2$ and can-pockets $f$ and antifriction-rollers $f'$, having shafts $f^2$ extending between the upper and lower disks or plates $f^3 f^4$ of the turret.

G G' are endless conveyers, preferably belts, each traveling on pulleys $G^2$ and each having a run or loop $g$, partially surrounding the turret and contacting with the cans thereon or in the pockets thereof.

H H' are rapidly-rotating soft flexible buffers mounted on and carried by the turrets F F', each turret having one buffer for each can-pocket thereon. Each of the rotary buffers H H' has a peripheral groove $h$ to adapt the same to fit the corner of the rotating can X and contact both with the head $x$ and body $x'$ of the can at the portions thereof which are coated with solder from the solder-bath. Each of the rotary buffers is preferably composed of a series of light thin soft flexible textile circular disks $h'$, preferably cotton-cloth disks, clamped together on the shaft $H^2$ with interposed washers or disks $h^2$ of smaller diameter. The shafts $H^2$ of each of the buffers is inclined, preferably at an angle of about forty-five degrees to the axis of the turret, and has a slight up-and-down or vertical swinging movement provided for by a pivotal connection $H^3$ to adapt the buffer to swing downward out of the way at the can-receiving and can-discharging stations or positions as the turret rotates. A stationary cam or sinuous track $H^4$ on the frame of the machine engaging a collar or shoe $H^5$ on the shaft $H^2$ serves to raise the buffer against the can and permit it to swing down out of the way to permit the can to be received on the turret and be discharged therefrom. The lower or non-pivotal portion $H^6$ of each buffer-shaft $H^2$ is journaled in a suitable bearing $H^7$ on a depending arm or bracket $F^3$ on the turret and has a bevel-gear $H^8$, which meshes with a bevel-gear K on the hollow driving-shaft K', which is furnished with a pulley $K^2$ and driven by a belt $K^3$ from any suitable source of power. Each of the buffers H H' is rotated at a high or buffing speed, preferably, say, from six hundred to twelve hundred revolutions per minute. The hollow driving-shaft K' and the hollow shaft $F^2$ of the turret F are each journaled on an upright stationary shaft or stem A' on the frame. Motion is communicated from the hollow driving-shaft K' to the turret F through a spur-gear $k$ on the shaft K', gear $k'$ on the shaft $k^2$, which is journaled on a stud or arm $k^3$ on a collar $k^4$, secured to the stationary shaft or stem A', and which shaft $k^2$ has a small gear $k^5$ meshing with a larger gear $F^4$ on the hollow shaft $F^2$ of the turret. The turret is thus given a comparatively slow revolution on its axis.

The endless conveyers or belts G G' are driven in the direction indicated by the arrows in Fig. 1 by suitable belts $g' g^2$ and pulleys $g^3 g^4 g^5 g^6$.

M M' are longitudinally-inclined runways having side guides $m$ and extending from and forming a continuation of the runways B B', respectively, and by which the cans are turned into an upright position and delivered into the can-receiving pockets of the turrets F F', and N N' are longitudinally-inclined chutes having side guides $n$ and extending from the turrets F F' to the cooling-belts D D', respectively, and by which after the surplus solder has been removed from the corners of the cans by the buffers H H' the cans are delivered onto the cooling-belts in an upright position.

The operation is as follows: The cans after passing along the runway B, first through the flux bath or device (not shown) and then through a solder bath or device C, roll down the runway M and are thereby turned into a substantially upright position, the runway M being transversely twisted, and delivered into the pockets of the continuously-rotating turret F, the endless belt G serving, in connection with the side guides $m$ of the runway M, to feed the cans into the pockets of the turret. As the turret F revolves the cans are rotated on their own axes by the belt G, operating in conjunction with the turret F and antifriction-rollers $f'$ thereon, and at the same time the stationary track or cam $H^4$ swings the rapidly-rotating buffer H up into position to contact with the rotating can, thus quickly removing the surplus solder from the corner of the can which was immersed in the solder-bath C. As the turret F continues to rotate the buffer H is slightly lowered out of contact with the can, and the can is discharged from the turret by contacting with the side guide $n$ of the chute N and is by it delivered onto the cooling-belt D'. From the cooling-belt D' the can is delivered in the usual manner at the opposite end of the soldering mechanism (which is not illustrated in the drawings) into the other runway B' with its other or unsoldered end now the downmost one. This other end of the can is then soldered and the surplus solder removed therefrom by the operation of the other turret F' in the same manner as above described.

As the particular construction of the soldering mechanism is immaterial to my invention and does not form part thereof, I have not herein shown or described in detail the construction of this soldering part of the machine. In my invention, however, I prefer to employ the form of soldering-machine which is shown and described in the Hodgson and Taliaferro patent, No. 704,257, of July 8, 1902, and have, therefore, in illustrating my invention indicated in the drawings that portion or end of the Hodgson and Taliaferro patent can-soldering machine to which my rotary buffer surplus-solder-removing improvement is directly combined and connected. For a more full description of the soldering mechanism I would refer to the specification and description of said Hodgson and Taliaferro patent.

I do not herein claim the combination with the solder-bath, transversely-inclined runways for the cans, means for rolling the cans along the runways, rotating can-carrying turrets having pockets to automatically receive the cans from inclined can-delivery runways, inclined runways for delivering the cans to the turrets, cooling-belts, and chutes for delivering the cans from the turrets to the cooling-belts, as this forms the subject of claim in my copending application, Serial No. 224,055, filed of even date herewith.

I claim—

1. In a can-end-soldering and surplus-solder-removing machine, the combination with a solder bath or device, of two transversely-inclined runways for the cans, endless flexible conveyers or chains for rolling the cans along said runways, two continuously-rotating turrets each furnished with pockets and antifriction-rollers to receive the cans, two endless conveyers or belts each having a run partially surrounding one of said turrets to rotate the cans, longitudinally-inclined chutes or runways for delivering the cans to the turrets, each of said turrets having a series of rotary buffers, substantially as specified.

2. In a can-end-soldering and surplus-solder-removing machine, the combination with a solder-bath, of two transversely-inclined runways for the cans, endless flexible conveyers or chains for rolling the cans along said runways, two cooling-belts, two continuously-rotating turrets each furnished with pockets and antifriction-rollers to receive the cans, two endless conveyers or belts each having a run partially surrounding one of said turrets to rotate the cans, a series of rotary buffers mounted on each of said turrets, longitudinally-inclined chutes or runways for delivering the cans from said transversely-inclined runways to the turrets, and chutes for delivering the cans from the turret to the cooling-belt, substantially as specified.

3. In a can-soldering and surplus-solder-removing machine, the combination with a solder-bath, a transversely-inclined runway for the cans, means for rolling the cans along said runway, a cooling-belt, a rotary turret furnished with pockets and antifriction-rollers to receive the cans, an endless conveyer or belt having a run or loop partially surrounding the turret to rotate the cans, a series of rotary buffers mounted on the turret and engaging the freshly-soldered seams of the cans and means for delivering the cans from the turret onto the cooling-belt, substantially as specified.

4. In a can-soldering and surplus-solder-removing machine, the combination with a solder-bath, a transversely-inclined runway for the cans, means for rolling the cans along said runway, a cooling-belt, a rotary turret furnished with pockets and antifriction-rollers to receive the cans, an endless conveyer or belt having a run or loop partially surrounding the turret to rotate the cans, a series of rotary buffers mounted on the turret and engaging the freshly-soldered seams of the cans, and a longitudinally-inclined chute or runway for delivering the cans to the turret and means for delivering the cans from the turret onto the cooling-belt, substantially as specified.

5. In a can-soldering and surplus-solder-removing machine, the combination with a solder-bath, a transversely-inclined runway for the cans, means for rolling the cans along said runway, a cooling-belt, a rotary turret furnished with pockets and antifriction-rollers to receive the cans, an endless conveyer or belt having a run or loop partially surrounding the turret to rotate the cans, a series of rotary buffers mounted on the turret and engaging the freshly-soldered seams of the cans, a longitudinally-inclined chute or runway for delivering the cans to the turret, and a chute or runway for delivering the cans from the turret to the cooling-belt, substantially as specified.

6. In a can-soldering and surplus-solder-removing machine, the combination with a soldering mechanism, of a rotary turret furnished with pockets and antifriction-rollers to receive the cans, an endless conveyer having a run partially surrounding the turret to rotate the cans, and a series of rotary buffers having pivotal or vertically-swinging shafts mounted on the turret, and a stationary cam or track for raising and lowering the buffers as the turret rotates, substantially as specified.

7. In a can-soldering and surplus-solder-removing machine, the combination with a solder-bath, a runway for the cans, means for rolling the cans along the runway, a rotary turret, means for holding and rotating the cans on the turret, means for automatically delivering the cans from the runway onto the turret and a series of rotary buffers mounted on the turret, substantially as specified.

8. In a can-soldering and surplus-solder-removing machine, the combination with a solder-bath, a runway for the cans, means for rolling the cans along the runway, a rotary turret, means for holding and rotating the cans on the turret, a series of rotary buffers mounted on the turret, and a chute or runway for delivering the cans to the turret, said turret having pockets to receive the cans automatically from said chute, substantially as specified.

9. In a can-soldering and surplus-solderremoving machine, the combination with a solder-bath, a runway for the cans, means for rolling the cans along the runway, a rotary turret, means for holding and rotating the cans on the turret, a series of rotary buffers mounted on the turret, a chute or runway for delivering the cans to the turret, said turret having pockets to receive the cans automatically from said chute, said rotary buffers having inclined and vertically-movable shafts, substantially as specified.

10. In a can-soldering and surplus-solder-removing machine, the combination with a solder-bath, a runway for the cans, means for rolling the cans along the runway, a rotary turret, means for holding and rotating the cans on the turret, a series of rotary buffers mounted on the turret, a chute or runway for delivering the cans to the turret, said rotary buffers having inclined and vertically-movable swinging shafts, and a stationary cam or track to raise and lower the buffers as the turret rotates, substantially as specified.

11. In a can-soldering and surplus-solder-removing machine, the combination with a solder-bath, a runway for the cans, means for rolling the cans along the runway, a rotary turret, a cooling-belt, means for holding and rotating the cans on the turret, and a series of rotary buffers mounted on the turret and means for delivering the cans from the turret onto the cooling-belt, substantially as specified.

12. In a can-soldering and surplus-solder-removing machine, the combination with a solder-bath, a runway for the cans, means for rolling the cans along the runway, a rotary turret, a cooling-belt, means for holding and rotating the cans on the turret, a series of rotary buffers mounted on the turret, a chute or runway for delivering the cans to the turret, a chute or runway for delivering the cans from the turret to the cooling-belt, said rotary buffers having inclined and vertically-movable shafts, and a stationary cam or track to raise and lower the buffers as the turret rotates, substantially as specified.

13. In a can-soldering and surplus-solder-removing machine, the combination with a soldering mechanism, of a rotary turret furnished with pockets and antifriction-rollers to receive the cans, an endless conveyer having a run partially surrounding the turret to rotate the cans, and a series of rotary buffers mounted on the turret and engaging the freshly-soldered seams of the cans, substantially as specified.

14. In a can-soldering and surplus-solder-removing machine, the combination with a soldering mechanism, of a rotary turret furnished with pockets and antifriction-rollers to receive the cans, an endless conveyer having a run partially surrounding the turret to rotate the cans, and a series of rotary buffers mounted on the turret and engaging the freshly-soldered seams of the cans, the shaft or axis of each rotary buffer extending at an angle to the axis of the turret, substantially as specified.

15. In a can-soldering and surplus-solder-removing machine, the combination with a soldering mechanism, of a rotary turret furnished with pockets and antifriction-rollers to receive the cans, an endless conveyer having a run partially surrounding the turret to rotate the cans, a series of rotary buffers mounted on the turret and engaging the freshly-soldered seams of the cans, the shaft or axis of each rotary buffer extending at an angle to the axis of the turret, and each rotary buffer having a groove in its periphery to cause the same to engage both the bottom or head and the side or body of the can, substantially as specified.

MEREDITH LEITCH.

Witnesses:
W. F. DUTTON,
A. R. GIBBS.